(12) United States Patent
Li et al.

(10) Patent No.: US 10,586,204 B2
(45) Date of Patent: Mar. 10, 2020

(54) DYNAMICALLY ADJUSTING A SAFETY STOCK LEVEL

(71) Applicant: International Business Machines Corporation, Armonk, NY (US)

(72) Inventors: Jialin Li, Westford, MA (US); Danai Tengtrakool, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 15/055,710

(22) Filed: Feb. 29, 2016

(65) Prior Publication Data

US 2017/0249583 A1 Aug. 31, 2017

(51) Int. Cl.
*G06Q 10/08* (2012.01)
*G06Q 30/06* (2012.01)

(52) U.S. Cl.
CPC ....... *G06Q 10/087* (2013.01); *G06Q 30/0633* (2013.01)

(58) Field of Classification Search
None
See application file for complete search history.

(56) References Cited

U.S. PATENT DOCUMENTS

| 6,931,347 | B2 | 8/2005 | Boedi et al. |
| 7,143,059 | B2 | 11/2006 | Galli |
| 7,840,454 | B2 | 11/2010 | Von Hemolt et al. |
| 8,027,863 | B2 | 9/2011 | Zimmermann |
| 8,315,923 | B2 | 11/2012 | McPhetrige |
| 8,706,536 | B1 | 4/2014 | McPhetrige |
| 8,856,032 | B2 | 10/2014 | Carlegren et al. |
| 9,747,632 | B2 | 8/2017 | Hicks et al. |
| 2002/0188505 | A1* | 12/2002 | Burrus, IV ........... G06Q 10/087 705/14.24 |
| 2005/0114237 | A1 | 5/2005 | Urso |
| 2009/0124350 | A1* | 5/2009 | Iddings ................ G07F 17/32 463/25 |
| 2010/0138037 | A1 | 6/2010 | Adelberg et al. |
| 2011/0029362 | A1* | 2/2011 | Roeding ............... G06Q 30/00 705/14.13 |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Fateh M Obaid

(74) *Attorney, Agent, or Firm* — Law Office of Jim Boice

(57) ABSTRACT

A method, system, and/or computer program product dynamically controls an available inventory level for a particular product. An in-store shopper identification receiver receives an in-store shopper's identification signal from an in-store shopper identification transmitter in a shopper's personal electronic device. Based on the in-store shopper being in the physical store, a local area network connection between the shopper's personal electronic device and a local area network in the physical store is activated, thus enabling a retrieval of an in-store shopper's wish list stored on the shopper's personal electronic device. The available inventory level for the particular product on the in-store shopper's wish list is then adjusted according to the presence of the in-store shopper in the store and the contents of the in-store shopper's wish list.

15 Claims, 5 Drawing Sheets

(56) References Cited

U.S. PATENT DOCUMENTS

| | | | |
|---|---|---|---|
| 2011/0047023 A1* | 2/2011 | Lieblang | G06Q 30/02 |
| | | | 705/14.36 |
| 2011/0191237 A1* | 8/2011 | Faith | G06F 1/1694 |
| | | | 705/39 |
| 2012/0022930 A1* | 1/2012 | Brouhard | G06Q 30/02 |
| | | | 705/14.22 |
| 2012/0022944 A1* | 1/2012 | Volpi | G06Q 30/00 |
| | | | 705/14.53 |
| 2012/0089461 A1* | 4/2012 | Greenspan | G06Q 20/12 |
| | | | 705/14.58 |
| 2013/0003575 A1* | 1/2013 | Konishi | H04W 74/0841 |
| | | | 370/252 |
| 2013/0275217 A1* | 10/2013 | Ramchandani | G06Q 30/02 |
| | | | 705/14.53 |
| 2013/0290096 A1* | 10/2013 | Lizotte, III | G06Q 30/0246 |
| | | | 705/14.45 |

* cited by examiner

US 10,586,204 B2

DYNAMICALLY ADJUSTING A SAFETY STOCK LEVEL

BACKGROUND

The present disclosure relates to the field of managing inventory in a store, and specifically to managing inventory in a store that handles both in-store purchases and on-line purchases. Still more specifically, the present invention relates to dynamically adjusting safety stock levels of inventory.

Physical "brick and mortar" stores often offer multiple selling channels to customers. That is, customers can come into the store to purchase an item off the shelf (i.e., an "in-store" purchase). Alternatively, customers can access a website for the store (i.e., go "on-line"), purchase the item, and then come into the physical store to pick the item up from "will call". Alternatively, customers can access the web site for the store, purchase the item, and then have the item delivered to their location.

In order to support these multiple selling channels, the store's physical inventory of items is exposed to both in-store and on-line shoppers. Due to the divergent channels, retailers keep a portion of store inventory set aside as safety stock, in order to avoid overselling the items. That is, an in-store shopper may have an item in his/her shopping cart, but has not yet checked out and paid for the item at a point of sale (POS) station (e.g., an intelligent cash register). Thus, the store's inventory computer will assume that the item is still available to on-line shoppers, although this is not the case (since the item is in the in-store shopper's cart). This issue is especially problematic for high-value items, such as jewelry, cameras, etc., which are typically kept in the store in low quantities (in order to reduce the amount of capital being tied up in inventory).

Thus, stores will keep a "safety stock" of each item. A "safety stock" is a buffer of available inventory. For example, an inventory system (computer) may show that there are three particular cameras (i.e., from the same manufacturer and of the same model) in stock. However, the inventory system will assume that at any point in time, one of those cameras is in an in-store shopper's cart, is lost, has been shoplifted, etc. (whether this is actually the case or not). Thus, the inventory system will establish this one camera as "safety stock" to handle these situations (i.e., the camera is in a cart but not purchased, the camera has been lost/stolen, etc.), leaving only two cameras in "inventory".

If the store is too cautious (e.g., keeps two of the three cameras held back as safety stock, such that only one camera is available for purchase), then the store has less inventory to offer for sale. If the store is not cautious enough (e.g., keeps no cameras held back as safety stock), then the store may oversell the item (i.e., promises to sell three cameras on-line even though one of the three cameras was in the in-store shopper's basket when the on-line orders came in).

SUMMARY

A method, system, and/or computer program product dynamically controls an available inventory level for a particular product. An in-store shopper identification receiver receives an in-store shopper's identification signal from an in-store shopper identification transmitter. The in-store shopper identification transmitter is a component of a shopper's personal electronic device that is in a possession of an in-store shopper, and receiving the in-store shopper's identification signal indicates a current presence of the in-store shopper in a physical store. In response to determining, based on the in-store shopper identification receiver receiving the in-store shopper's identification signal, that the in-store shopper is in the physical store, one or more processors activate a local area network connection between the shopper's personal electronic device and a local area network in the physical store. The processor(s) then retrieve an in-store shopper's wish list stored on the shopper's personal electronic device. The in-store shopper's wish list describes a quantity of a particular product within the physical store that the in-store shopper has registered an interest in acquiring, and is accessed by the one or more processors via the local area network. The processor(s) then determine whether an available inventory level for the particular product on the in-store shopper's wish list is below a predetermined level in the physical store. In response to determining that the available inventory level for the particular product is below the predetermined level in the physical store, the processor(s) reduce an on-line availability quantity of the particular product by the quantity of the particular product described in the in-store shopper's wish list. The processor(s) monitor a point of sale terminal in the physical store for a purchase of the particular product by the in-store shopper. The in-store shopper identification receiver receives an in-store shopper's exiting signal from the shopper's personal electronic device. The in-store shopper's exiting signal indicates that the in-store shopper is exiting the physical store. In response to determining, based on the monitoring of the point of sale terminal and the in-store shopper's exiting signal, that the in-store shopper has not purchased the quantity of the particular product described in the in-store shopper's wish list, the processor(s) increase the on-line availability quantity of the particular product by the quantity of the particular product described in the in-store shopper's wish list.

DETAILED DESCRIPTION

Figure 1:
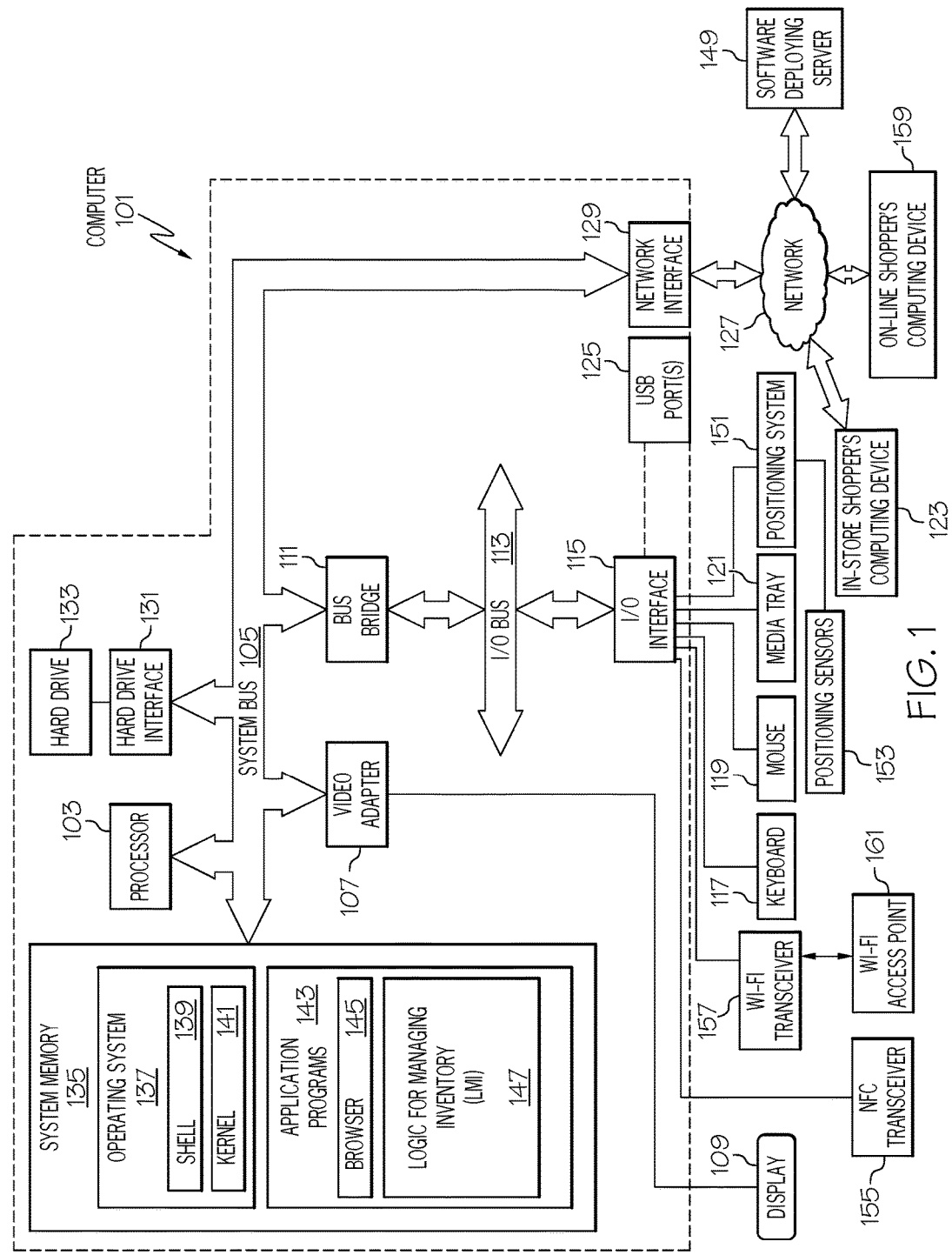
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by in-store shopper's computing device 123 and/or software deploying server 149 and/or positioning system 151 and/or on-line shopper's computing device 159 and/or Wi-Fi access point 161 shown in FIG. 1, and/or managing computer 201 and/or manufacturing device controller 212 and/or shopper's personal electronic device 223 and/or on-line shopper's computer 259 shown in FIG. 2.

Exemplary computer 101 includes a processor 103 that is coupled to a system bus 105. Processor 103 may utilize one or more hardware processors, each of which has one or more hardware processor cores. A video adapter 107, which drives/supports a display 109, is also coupled to system bus

105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, shopper's personal electronic device 223 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., in-store shopper's computing device 123, on-line shopper's computing device 159) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Inventory (LMI) 147. LMI 147 includes code for implementing the processes described below, including those described in FIGS. 2-3. In one embodiment, computer 101 is able to download LMI 147 from software deploying server 149, including in an on-demand basis, wherein the code in LMI 147 is not downloaded until needed for execution. Furthermore, in one embodiment of the present invention, software deploying server 149 performs all of the functions associated with the present invention (including execution of LMI 147), thus freeing computer 101 from having to use its own internal computing resources to execute LMI 147.

Also associated with computer 101 is a near field communication (NFC) transceiver 155, which is representative of a transceiver capable of sending and receiving wireless electronic signals over a limited distance (e.g., less than 100').

Also associated with computer 101 is a Wi-Fi transceiver 157, which is able to communicate with the Internet via a Wi-Fi access point 161, and/or to establish communications between Wi-Fi enabled devices.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
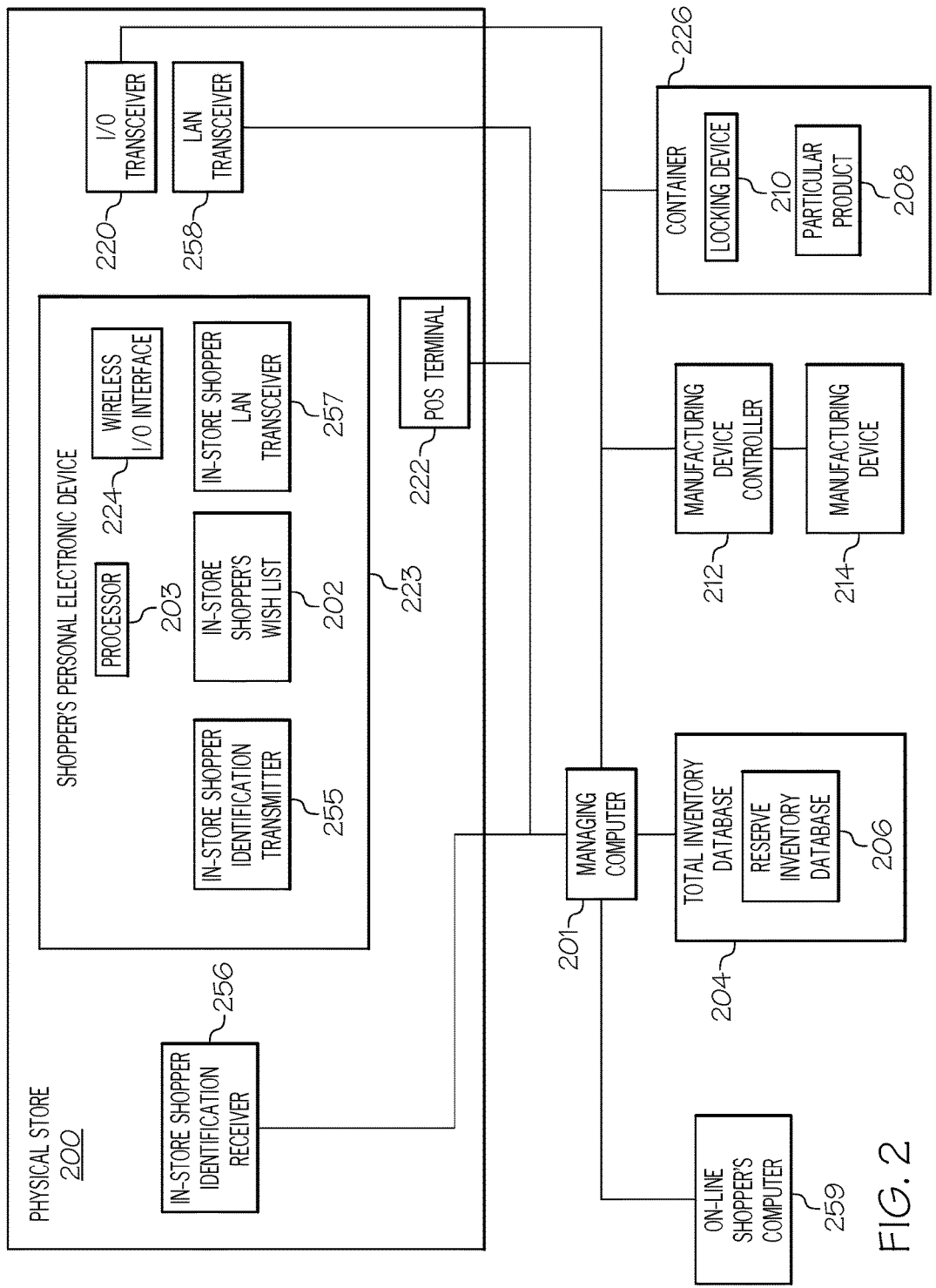
FIG. 2 illustrates detail of an exemplary in-store based system used to implement one or more embodiments of the present invention.

FIG. 2 illustrates detail of an exemplary in-store based system used to implement one or more embodiments of the present invention.

A physical store 200 is a physical structure (e.g., a physical retail store) used for retail purposes. Assume now that a person (i.e., in-store shopper) enters the physical store 200. Assume further that in the possession of (i.e., being carried by, in the purse of, etc.) the in-store shopper is a shopper's personal electronic device 223 (analogous to in-store shopper's computing device 123). Shopper's personal electronic device 223 may be a smart phone, a tablet computer, etc.

Within the shopper's personal electronic device 223 is an in-store shopper identification transmitter 255 (analogous to NFC transceiver 155 shown in FIG. 1). In-store shopper identification transmitter 255 is able to wirelessly transmit an identification signal (e.g., a name of the in-store shopper) of the in-store shopper to a nearby in-store shopper identification receiver 256 (another device that is also analogous to NFC transceiver 155 shown in FIG. 1). In a preferred embodiment, this wireless transaction 1) identifies that this particular shopper is entering the physical store 200, and then later 2) identifies that this particular shopper is leaving the physical store 200.

In response to the in-store shopper entering the physical store 200, managing computer 201 sends a signal to a processor 203 (analogous to processor 103 shown in FIG. 1) via an I/O transceiver 220 to a wireless I/O interface 224 (e.g., a NFC interface, a Wi-Fi interface, etc.), directing the processor 203 to activate an in-store shopper local area network (LAN) transceiver 257 (analogous to Wi-Fi transceiver 157 shown in FIG. 1). That is, the managing computer 201 directs a LAN communication session to be initiated between in-store shopper LAN transceiver 257 in the shopper's personal electronic device 223 and LAN transceiver 258 in the physical store 200.

Once this LAN communication session is initiated, the managing computer 201 is able to access an in-store shopper's wish list 202 within the shopper's personal electronic device 223. In-store shopper's wish list 202 contains a list of products that the user of the shopper's personal electronic device 223 has indicated an interest in acquiring. The in-store shopper's wish list 202 may be obtained by the shopper directly inputting the name of the product (or a description thereof) into the in-store shopper's wish list 202. Alternatively, the in-store shopper's wish list 202 may be accessed from a database (not shown) that is not in the shopper's personal electronic device 223 (e.g., is accessible via the Internet), but is nonetheless accessible to the managing computer 201. Similarly and in an alternative embodiment, the in-store shopper's profile (discussed herein) may be accessed from a database that is not contained within the shopper's personal electronic device 201.

In another embodiment, the in-store shopper's wish list 202 is derived from the shopper visiting a webpage about the product. This browsing history of the shopper is then used by processor 203 to determine that the shopper is interested in the product, and automatically adds the product to the in-store shopper's wish list 202.

In another embodiment, the shopper's profile (e.g., describing his/her interests, activities, etc.) is used by processor 203 to determine that the shopper is interested in a certain product, which is then automatically added to the in-store shopper's wish list 202.

Once the managing computer 201 1) recognizes that the shopper has entered the physical store 200 (through use of the in-store shopper identification transmitter 255 and the in-store shopper identification receiver 256); 2) establishes a wireless LAN communication session (through the use of I/O transceiver 220, wireless I/O interface 224, LAN transceiver 258, and in-store shopper LAN transceiver 257); and 3) examines the in-store shopper's wish list 202, the managing computer 201 makes that assumption that the in-store shopper is visiting the physical store 200 in order to purchase any item on the in-store shopper's wish list 202 that is in the store's inventory (as recorded in total inventory database 204).

Based on what is in the in-store shopper's wish list 202 and the total inventory database 204, the managing computer 204 will reduce the available inventory by increasing the entries in the reserve inventory database 206. That is, the available inventory in the physical store is equal to the inventory shown in the total inventory database 204 minus the inventory shown in the reserve inventory database 206. Thus, increasing the entries in the reserve inventory database 206 decreases the available inventory shown in the total inventory database 204.

Therefore, reserve inventory database 206 represents "safety stock" inventory that is "held back" in order to meet expected demand for particular products, both from in-store shoppers in the physical store 200 as well as on-line shoppers using computers such as on-line shopper's computer 259 (analogous to on-line shopper's computing device 159 shown in FIG. 1).

As discussed below, physical store 200 also has check out stations, including the depicted point of sale (POS) terminal 222. Managing computer 201 monitors the activity of POS terminal 222 along with in-store shopper identification receiver 256. Thus, if managing computer 201 detects that the in-store shopper has purchased one or more items from the in-store shopper's wish list 202 at the POS terminal 222, then these item(s) are removed from the total inventory database 204. However, if managing computer 201 detects 1) that the in-store shopper has left the physical store 200 (as detected by in-store shopper identification receiver 256 receiving a shopper identification signal from in-store shopper identification transmitter 255 as the in-store shopper is leaving the physical store 200) without 2) purchasing one or more items in the in-store shopper's wish list 202 at the POS terminal 222, then these item(s) are removed from the reserve inventory database 206, resulting in the item(s) being added back into the total inventory database 204 (and thus the total available inventory).

As shown in FIG. 2, once the in-store shopper enters the physical store 200 and the managing computer 201 identifies items on the in-store shopper's wish list 202 that are in stock in the physical store (as recorded in total inventory database 204), the managing computer 201 will take steps to ensure that enough copies/instances of those items are in stock to meet expected demand. Various steps can be taken to ensure this product availability.

For example and in one embodiment of the present invention, assume that a particular product 208 from the in-store shopper's wish list 202 is kept in a locked container 226 (i.e., a locked display, case, bin, etc.) that is protected by a locking device 210 that is under the control of managing computer 201. That is, a locking device 210 is an electromechanical device that can be remotely controlled by managing computer 201 to lock up the container 226, thus preventing access to the particular product 208 when deemed necessary to ensure that the particular product 208 is still available to other shoppers (including on-line shoppers). Thus, the in-store shopper will have access to the particular product 208 by having a salesperson unlock the locking device 210, or another instance of the particular product 208 may be available in an unsecured location in the physical store 200. However, once a determination is made that the in-store shopper is interested in (any instance of) that particular product 208, then the safety stock of particular product 208 is kept locked away in container 226, in order to meet the demand of other shoppers, on-line and/or in-store.

In an embodiment of the present invention, the managing computer 201 ensures that there are enough copies/instances of the particular product 208 for on-line and in-store demand by directing a manufacturing device controller 212 to use a manufacturing device 214 to make more copies of the particular product. For example, assume that manufacturing device 214 is a three-dimensional (3-D) printer, which is able to create products by printing layers of physical material(s) until the particular product 208 is formed. If the managing computer 201 determines that not increasing the reserve inventory shown in reserve inventory database 206 (due to the shopper with the in-store shopper's wish list 202 entering the physical store 200) will result in an inadequate amount of reserve inventory for the particular product 208, then the manufacturing device 214 will build more copies of the particular product 208, such that the total amount of available inventory for the particular product 208 is increased.

Figure 3:
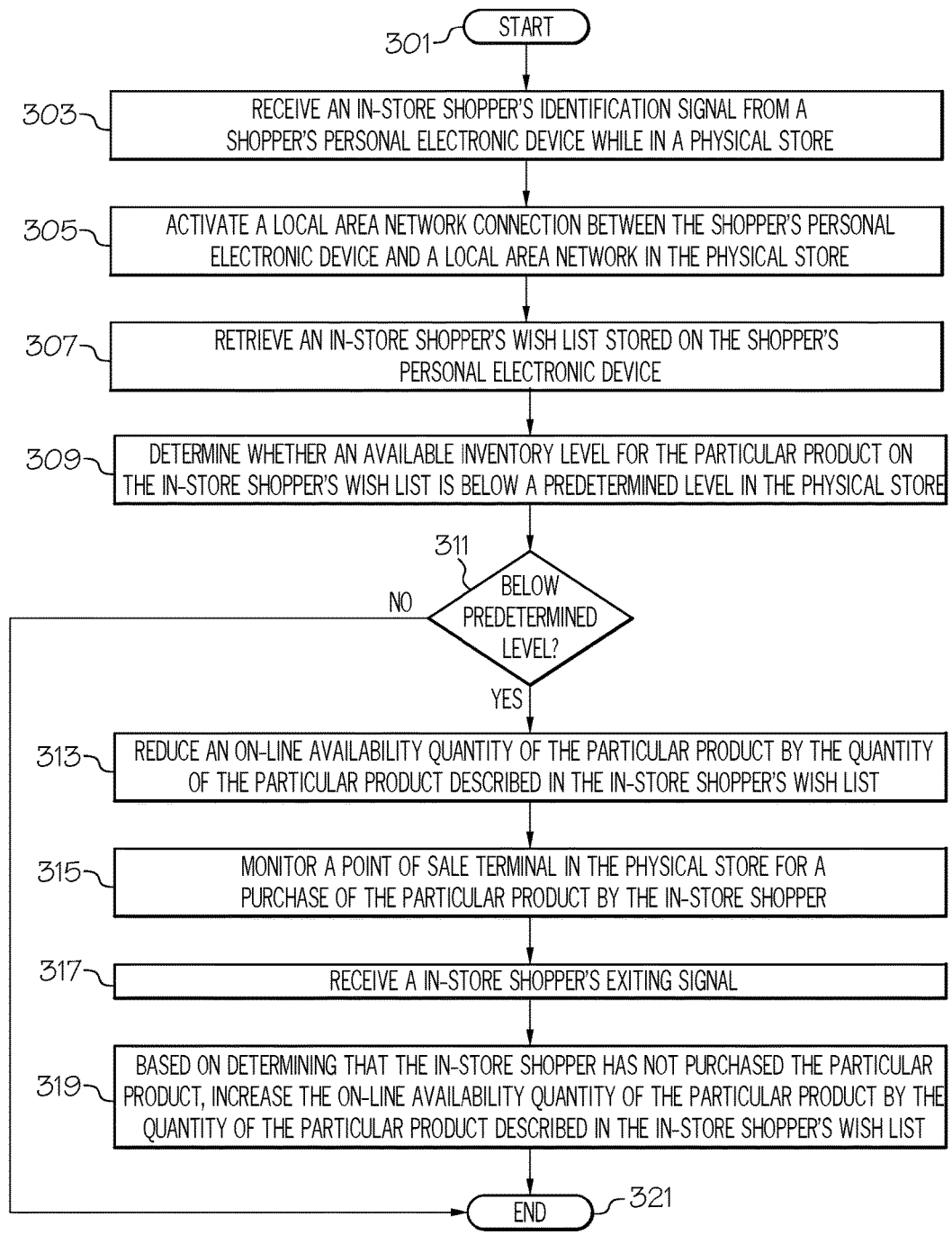
FIG. 3 is a high-level flow chart of one or more steps performed by one or more computing and/or other hardware devices to dynamically control an available inventory level for a particular product in accordance with one or more embodiments of the present invention.

With reference now to FIG. 3, a high-level flow chart of one or more steps performed by one or more computing and/or other hardware devices to dynamically control an available inventory level for a particular product in accordance with one or more embodiments of the present invention is presented.

After initiator block 301, an in-store shopper identification receiver (e.g., in-store shopper identification receiver 256 shown in FIG. 1) receives an in-store shopper's identification signal from an in-store shopper identification transmitter (e.g., in-store shopper identification transmitter 255 shown in FIG. 2), as described in block 303. The in-store shopper identification transmitter is a component of a shopper's personal electronic device (e.g., shopper's personal electronic device 223 shown in FIG. 2), which is in a possession of an in-store shopper. Thus, at this stage, when the in-store shopper identification receiver 256 receives the shopper's ID, this indicates that the shopper is entering the store, and thus indicates a current presence of the in-store shopper in a physical store. This initial identification of the shopper being in the physical store may be based on no current identification readings for the shopper in the managing computer 201, or may be based on the in-store shopper identification receiver 256 actually being two or more receivers, each of which receive the shopper's electronic ID signal from the in-store shopper identification transmitter 255, thus providing managing computer 201 temporal readings indicative of the shopper entering (i.e., heading towards) the physical store 200.

As descried in block 305, one or more processors (e.g., within managing computer 201) determine, based on the in-store shopper identification receiver receiving the in-store shopper's identification signal, that the in-store shopper is in the physical store, one or more processors (e.g., within managing computer 201) activate a local area network (LAN) connection between the shopper's personal electronic device and a local area network in the physical store. For example and as described above, managing computer 201 can send a signal via I/O transceiver 220 to wireless I/O interface 224 directing the processor 203 to activate the in-store shopper LAN transceiver 257. This allows the shopper's personal electronic device 223 to now communicate with LAN transceiver 258 (e.g., a Wi-Fi modem), thus allowing managing computer 201 to communicate with processor 203.

As described in block 307, one or more processors retrieve an in-store shopper's wish list (e.g., in-store shopper's wish list 202 shown in FIG. 2) that is stored on the shopper's personal electronic device. As described herein, the in-store shopper's wish list describes a quantity of a particular product within the physical store that the in-store shopper has registered an interest in acquiring. As also described herein, wherein the in-store shopper's wish list is accessed by the processor(s) (e.g., within managing computer 201) via the local area network.

As described in block 309, the processor(s) determine whether an available inventory level for the particular product on the in-store shopper's wish list is below a predetermined level in the physical store. For example, assume that the in-store shopper's wish list 202 has an entry for "Camera C", which is model M of a camera manufactured by manufacturer M. Assume further that physical store 200 carries Camera C in stock, but they are down to their last three Camera C's ("below a predetermined level" for the "available inventory level").

As described in query block 311, a determination is made that the available inventory level for the particular product is below the predetermined level in the physical store. If so, then (as described in block 313) the processor(s) reduce an on-line availability quantity of the particular product by the quantity of the particular product described in the in-store shopper's wish list. That is, if the store has three copies of Camera C in stock, and the shopper's wish list shows that the physical (in-store) shopper is interested in buying Camera C (just one instance/copy of Camera C), then the available quantity of Camera C to on-line shoppers is reduced by one (down to two).

As described in block 315, the processor(s) monitor a point of sale terminal (e.g., POS terminal 222 shown in FIG. 2) for a purchase of the particular product by the in-store shopper. This monitoring will determine whether or not the in-store shopper has actually purchased the particular product 208 that is on the in-store shopper's wish list 202.

As described in block 317, the in-store shopper identification receiver receives an in-store shopper's exiting signal from the shopper's personal electronic device, where the in-store shopper's exiting signal indicates that the in-store shopper is exiting the physical store. That is, initially the in-store shopper identification receiver 256 detected that the in-store shopper was entering the physical store 202. Now, however, the in-store shopper identification receiver 256 is detecting that the in-store shopper is leaving the physical store 202. This determination can be made in various ways. For example, assume that in-store shopper identification receiver 256 is actually a series of two or more receivers, thus allowing managing computer 201 to receive temporally separated signals from the receivers that indicate that the in-store shopper is walking away from (i.e., exiting) the physical store 200.

As described in block 319, in response to determining, based on the monitoring of the point of sale terminal and the in-store shopper's exiting signal, that the in-store shopper has not purchased the quantity of the particular product described in the in-store shopper's wish list, the processor(s) increase the on-line availability quantity of the particular product by the quantity of the particular product described in the in-store shopper's wish list. That is, whatever quantity of the particular product that was being held in reserve (safety stock), based on the presence of the in-store shopper and the presence of the particular product on his shopper's wish list, that quantity of the particular product is now removed from the reserve inventory database 206, thus making it available to any customer, both in-store and on-line.

The flow chart ends at terminator block 321.

In an embodiment of the present invention, one or more processors (e.g., within managing computer 201 shown in FIG. 2) receive an on-line order (e.g., from on-line shopper's computer 259 shown in FIG. 2) for the particular product. The processor(s) determine that the available inventory level for the particular product in the physical store has been determined to be less than a quantity of the particular product being ordered by the on-line order before the in-store shopper has exited the physical store. That is, the system has assumed that the in-store shopper will be buying a certain quantity of the particular product 208, even though he/she has not yet done so (e.g., the particular product may be in his/her shopping cart). Based on this assumption, the managing computer determines that there are not enough embodiments of the particular product 208 in stock to fill the on-line order. Thus, in response to determining that the available inventory level for the particular product in the physical store is less than the quantity of the particular product being ordered by the on-line order before the in-store shopper has exited the physical store, the processor(s) adjust the available inventory of the particular product in the physical store in order to supply the quantity of the particular product being ordered by the on-line order.

In one embodiment, this supply adjustment is achieved by preventing other in-store shoppers within the physical store from purchasing the particular product. That is, the safety stock level may assume that other in-store shoppers will want to purchase the particular product (with or without use of their shoppers' lists). As such, they will be prevented from purchasing the particular product, since that would remove inventory needed to fill the on-line order.

As described herein, in one embodiment such other in-store shoppers are prevented from accessing/purchasing the particular product 208 by locking it up in container 226. That is, the processor(s) prevent the other in-store shoppers from purchasing the particular product by activating a locking device 210 that prevents physical access to the particular product 208.

In an embodiment of the present invention, the other in-store shoppers are prevented from purchasing the particular product by issuing, by the one or more processors, a message to the other in-store shoppers that the particular product is no longer available for purchase. That is, managing computer 201 can cause a display near the particular product 208 to present the message/alert "Particular product 208 is no longer available for purchase". Similarly, such a message can be broadcast to other electronic devices (e.g., versions of shopper's personal electronic device 223) being carried by the other in-store shoppers.

In an embodiment of the present invention, one or more processors adjusts the available inventory level for the particular product in the physical store by issuing instructions to a manufacturing device to produce an additional quantity of the particular product. That is, managing computer 201 will direct manufacturing device controller 212 to activate manufacturing device 214 to create more instances of the particular product 208.

In an embodiment of the present invention, the in-store shopper identification transmitter 225 and the in-store shopper identification receiver 256 shown in FIG. 2 are on a near field communication (NFC) network.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
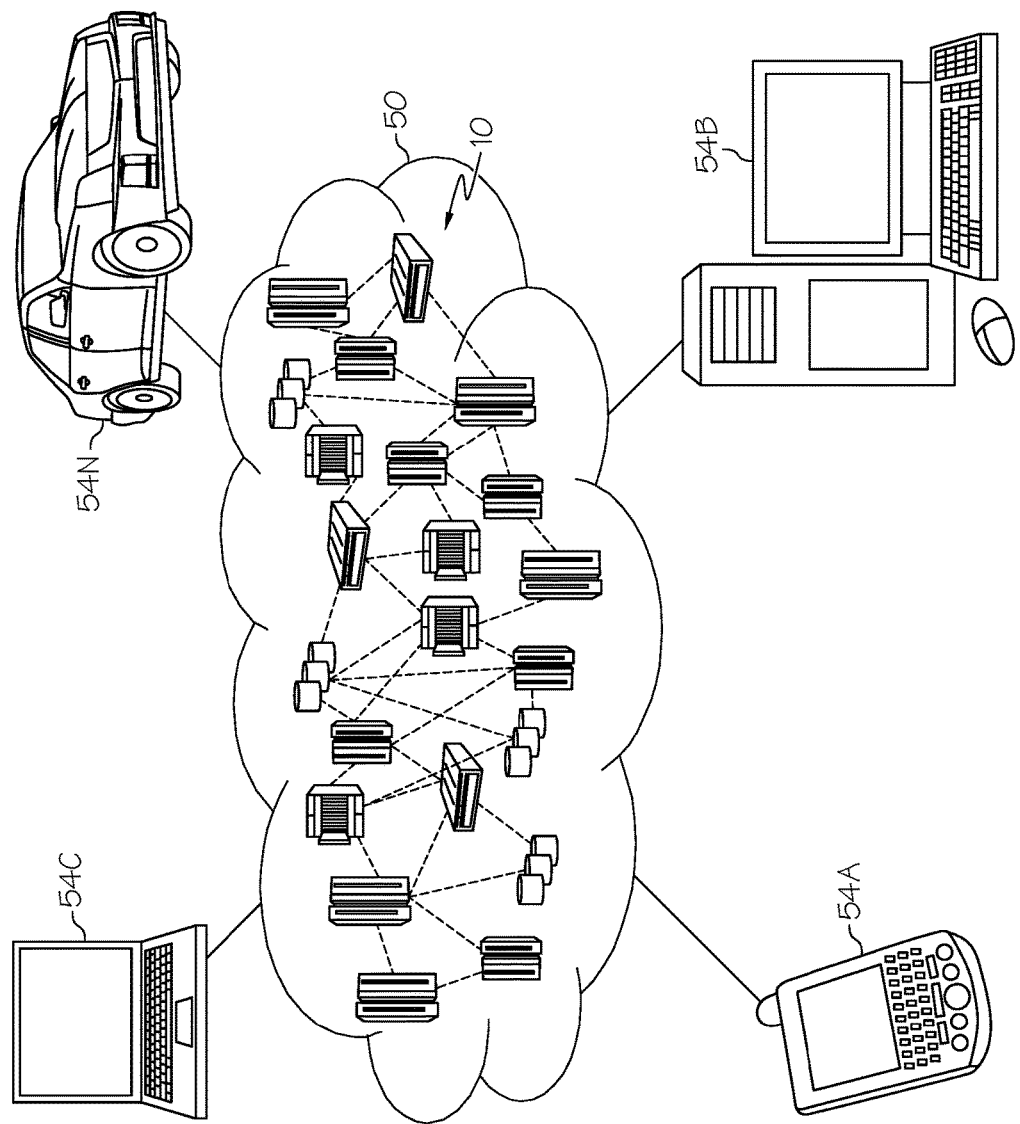
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
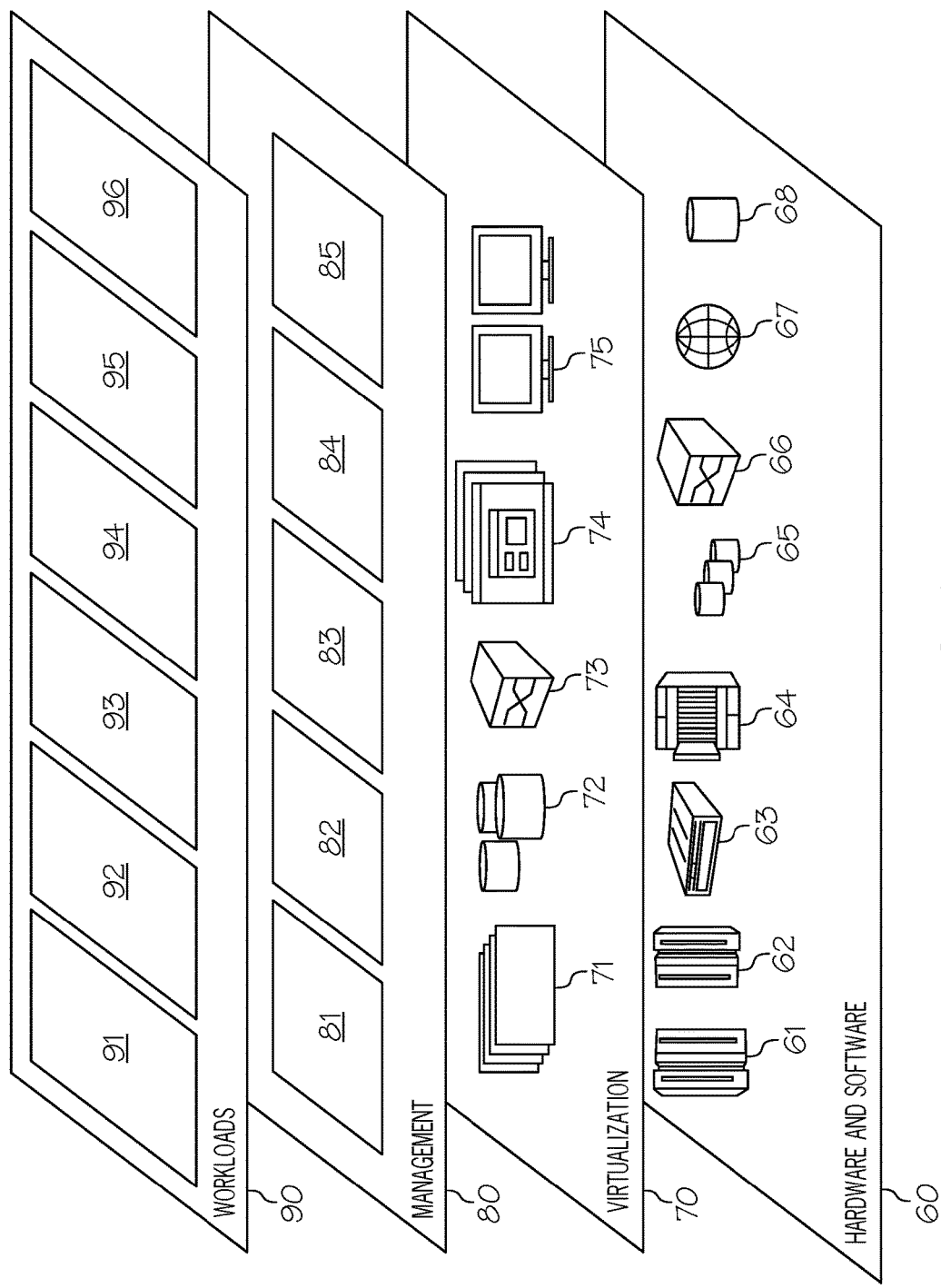
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inventory control processing 96 (i.e., processing that performs one or more features of the invention described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by one or more processors, an in-store shopper's identification signal that is transmitted from an in-store shopper identification transmitter to an in-store shopper identification receiver, wherein the in-store shopper identification transmitter is a component of a shopper's personal electronic device that is in a possession of an in-store shopper, and wherein receiving the in-store shopper's identification signal indicates an in-store shopper's presence in a physical store;
    in response to determining, by one or more processors and based on the in-store shopper identification receiver receiving the in-store shopper's identification signal, that the in-store shopper is in the physical store, activating, by the one or more processors, a local area network connection between the shopper's personal electronic device and a local area network in the physical store;

retrieving, by one or more processors, an in-store shopper's wish list stored on the shopper's personal electronic device, wherein the in-store shopper's wish list describes a quantity of a particular product that the in-store shopper has registered an interest in acquiring, and wherein the in-store shopper's wish list is accessed by the one or more processors via the local area network;

in response to determining that an available inventory level for the particular product is below the predetermined level in the physical store, reducing, by one or more processors, an on-line availability quantity of the particular product by the quantity of the particular product;

monitoring, by one or more processors, a point of sale terminal in the physical store for a purchase of the particular product by the in-store shopper;

adjusting, by one or more processors, the available inventory level for the particular product in the physical store by transmitting a message to other in-store shoppers' personal electronic devices that the particular product is no longer available for purchase;

receiving, by one or more processors, an in-store shopper's exiting signal from the shopper's personal electronic device to the in-store shopper identification receiver, wherein the in-store shopper's exiting signal indicates that the in-store shopper is exiting the physical store; and in response to determining, based on the monitoring of the point of sale terminal and the in-store shopper's exiting signal, that the in-store shopper has not purchased the quantity of the particular product described in the in-store shopper's wish list, increasing, by one or more processors, the on-line availability quantity of the particular product by the quantity of the particular product.

2. The method of claim 1, further comprising:
receiving, by one or more processors, an on-line order for the particular product;
determining, by one or more processors, that the available inventory level for the particular product in the physical store is less than a quantity of the particular product being ordered by the on-line order before the in-store shopper has exited the physical store; and
in response to determining that the available inventory level for the particular product in the physical store is less than the quantity of the particular product being ordered by the on-line order before the in-store shopper has exited the physical store, adjusting, by one or more processors, the available inventory of the particular product in the physical store in order to supply the quantity of the particular product being ordered by the on-line order.

3. The method of claim 1, further comprising:
adjusting, by one or more processors, the available inventory level for the particular product in the physical store by activating a locking device that prevents physical access by other in-store shoppers to the particular product.

4. The method of claim 1, further comprising:
adjusting, by one or more processors, the available inventory level for the particular product in the physical store by issuing instructions to a manufacturing device to produce at least one quantity of the particular product.

5. The method of claim 1, further comprising:
determining, by one or more processors, whether the available inventory level for the particular product on the in-store shopper's wish list is below the predetermined level in the physical store by comparing a difference of a known available quantity of the particular product minus the quantity of the particular product on the in-store shopper's wish list to a predetermined safety quantity of the particular product to be held in reserve.

6. A computer program product comprising one or more computer readable storage mediums, and program instructions stored on at least one of the one or more computer readable storage mediums, the stored program instructions comprising:
program instructions to receive an in-store shopper's identification signal that is transmitted from an in-store shopper identification transmitter to an in-store shopper identification receiver, wherein the in-store shopper identification transmitter is a component of a shopper's personal electronic device that is in a possession of an in-store shopper, and wherein receiving the in-store shopper's identification signal indicates an in-store shopper's presence in a physical store;
program instructions to, in response to determining, based on the in-store shopper identification receiver receiving the in-store shopper's identification signal, that the in-store shopper is in the physical store, activate a local area network connection between the shopper's personal electronic device and a local area network in the physical store;
program instructions to retrieve an in-store shopper's wish list stored on the shopper's personal electronic device, wherein the in-store shopper's wish list describes a quantity of a particular product that the in-store shopper has registered an interest in acquiring, and wherein the in-store shopper's wish list is accessed via the local area network;
program instructions to, in response to determining that an available inventory level for the particular product is below the predetermined level in the physical store, reduce an on-line availability quantity of the particular product by the quantity of the particular product;
program instructions to adjust the available inventory level for the particular product in the physical store by transmitting a message to other in-store shoppers' personal electronic devices that the particular product is no longer available for purchase;
program instructions to monitor a point of sale terminal in the physical store for a purchase of the particular product by the in-store shopper;
program instructions to receive an in-store shopper's exiting signal from the shopper's personal electronic device to the in-store shopper identification receiver, wherein the in-store shopper's exiting signal indicates that the in-store shopper is exiting the physical store; and
program instructions to, in response to determining, based on the monitoring of the point of sale terminal and the in-store shopper's exiting signal, that the in-store shopper has not purchased the quantity of the particular product described in the in-store shopper's wish list, increase the on-line availability quantity of the particular product by the quantity of the particular product.

7. The computer program product of claim 6, further comprising:
program instructions to receive an on-line order for the particular product;

program instructions to determine that the available inventory level for the particular product in the physical store is less than a quantity of the particular product being ordered by the on-line order before the in-store shopper has exited the physical store; and program instructions to, in response to determining that the available inventory level for the particular product in the physical store is less than the quantity of the particular product being ordered by the on-line order before the in-store shopper has exited the physical store, adjust the available inventory of the particular product in the physical store in order to supply the quantity of the particular product being ordered by the on-line order.

8. The computer program product of claim 6, further comprising:

program instructions to adjust the available inventory level for the particular product in the physical store by activating a locking device that prevents physical access by other in-store shoppers to the particular product.

9. The computer program product of claim 6, further comprising:

program instructions to adjust the available inventory level for the particular product in the physical store by issuing instructions to a manufacturing device to produce at least one quantity of the particular product.

10. The computer program product of claim 6, further comprising:

program instructions to determine whether the available inventory level for the particular product on the in-store shopper's wish list is below the predetermined level in the physical store by comparing a difference of a known available quantity of the particular product minus the quantity of the particular product on the in-store shopper's wish list to a predetermined safety quantity of the particular product to be held in reserve.

11. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to receive an in-store shopper's identification signal that is transmitted from an in-store shopper identification transmitter to an in-store shopper identification receiver, wherein the in-store shopper identification transmitter is a component of a shopper's personal electronic device that is in a possession of an in-store shopper, and wherein receiving the in-store shopper's identification signal indicates an in-store shopper's presence in a physical store;

program instructions to, in response to determining, based on the in-store shopper identification receiver receiving the in-store shopper's identification signal, that the in-store shopper is in the physical store, activate a local area network connection between the shopper's personal electronic device and a local area network in the physical store;

program instructions to retrieve an in-store shopper's wish list stored on the shopper's personal electronic device, wherein the in-store shopper's wish list describes a quantity of a particular product that the in-store shopper has registered an interest in acquiring, and wherein the in-store shopper's wish list is accessed via the local area network;

program instructions to, in response to determining that an available inventory level for the particular product is below the predetermined level in the physical store, reduce an on-line availability quantity of the particular product by the quantity of the particular product;

program instructions to adjust the available inventory level for the particular product in the physical store by transmitting a message to other in-store shoppers' personal electronic devices that the particular product is no longer available for purchase;

program instructions to monitor a point of sale terminal in the physical store for a purchase of the particular product by the in-store shopper;

program instructions to receive an in-store shopper's exiting signal from the shopper's personal electronic device to the in-store shopper identification receiver, wherein the in-store shopper's exiting signal indicates that the in-store shopper is exiting the physical store; and program instructions to, in response to determining, based on the monitoring of the point of sale terminal and the in-store shopper's exiting signal, that the in-store shopper has not purchased the quantity of the particular product described in the in-store shopper's wish list, increase the on-line availability quantity of the particular product by the quantity of the particular product.

12. The computer system of claim 11, further comprising:

program instructions to receive an on-line order for the particular product;

program instructions to determine that the available inventory level for the particular product in the physical store is less than a quantity of the particular product being ordered by the on-line order before the in-store shopper has exited the physical store; and program instructions to, in response to determining that the available inventory level for the particular product in the physical store is less than the quantity of the particular product being ordered by the on-line order before the in-store shopper has exited the physical store, adjust the available inventory of the particular product in the physical store in order to supply the quantity of the particular product being ordered by the on-line order.

13. The computer system of claim 11, further comprising:

program instructions to adjust the available inventory level for the particular product in the physical store by activating a locking device that prevents physical access of other in-store shoppers to the particular product.

14. The computer system of claim 11, further comprising:

program instructions to adjust the available inventory level for the particular product in the physical store by issuing instructions to a manufacturing device to produce at least one quantity of the particular product.

15. The computer system of claim 11, further comprising:

program instructions to determine whether the available inventory level for the particular product on the in-store shopper's wish list is below the predetermined level in the physical store by comparing a difference of a known available quantity of the particular product minus the quantity of the particular product on the in-store shopper's wish list to a predetermined safety quantity of the particular product to be held in reserve.

\* \* \* \* \*